United States Patent
Cowburn et al.

(10) Patent No.: US 11,488,358 B2
(45) Date of Patent: Nov. 1, 2022

(54) AUGMENTED REALITY SESSION CREATION USING SKELETON TRACKING

(71) Applicant: Snap Inc., Santa Monica, CA (US)

(72) Inventors: Piers Cowburn, London (GB); David Li, London (GB); Isac Andreas Müller Sandvik, London (GB); Qi Pan, London (GB); Matan Zohar, Rishon LeZion (IL)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/782,874

(22) Filed: Feb. 5, 2020

(65) Prior Publication Data
US 2021/0241529 A1    Aug. 5, 2021

(51) Int. Cl.
| | | |
|---|---|---|
| G06T 19/00 | (2011.01) | |
| G06T 7/73 | (2017.01) | |
| H04L 65/1069 | (2022.01) | |
| H04L 65/1089 | (2022.01) | |
| G06V 40/10 | (2022.01) | |

(52) U.S. Cl.
CPC ............... *G06T 19/00* (2013.01); *G06T 7/75* (2017.01); *G06V 40/103* (2022.01); *H04L 65/1069* (2013.01); *H04L 65/1089* (2013.01); *G06T 2219/024* (2013.01)

(58) Field of Classification Search
CPC ..... G06T 19/00; G06T 7/75; G06T 2219/024; G06K 9/00369; H04L 65/1069; H04L 65/1089
See application file for complete search history.

(56) References Cited

U.S. PATENT DOCUMENTS

| | | |
|---|---|---|
| 7,971,156 B2 | 6/2011 | Albertson et al. |
| 9,225,897 B1 | 12/2015 | Sehn et al. |
| 9,276,886 B1 | 3/2016 | Samaranayake |
| 9,705,831 B2 | 7/2017 | Spiegel |
| 9,742,713 B2 | 8/2017 | Spiegel et al. |
| 10,102,423 B2 | 10/2018 | Shaburov et al. |

(Continued)

FOREIGN PATENT DOCUMENTS

WO    WO-2019143572 A1    7/2019

OTHER PUBLICATIONS

"International Application Serial No. PCT/US2021/016579, International Search Report dated May 10, 2021", 6 pgs.

(Continued)

*Primary Examiner* — Matthew Salvucci
(74) *Attorney, Agent, or Firm* — Schwegman Lundberg & Woessner, P.A.

(57) ABSTRACT

Methods and systems are disclosed for creating a shared augmented reality (AR) session. The methods and systems perform operations comprising: receiving, by a second device, a request to join an AR session initialized by a first device; in response to receiving the request, detecting a body corresponding to a user of the first device in one or more images captured by a camera of the second device; identifying a body part of the detected body corresponding to the user of the first device; determining, by the second device, a transformation in the AR session between the first device and the second device using the identified body part; and causing the AR session to be displayed by the second device based on the determined transformation.

20 Claims, 8 Drawing Sheets

(56) References Cited

U.S. PATENT DOCUMENTS

| | | |
|---|---|---|
| 10,284,508 B1 | 5/2019 | Allen et al. |
| 10,439,972 B1 | 10/2019 | Spiegel et al. |
| 10,509,466 B1 | 12/2019 | Miller et al. |
| 10,514,876 B2 | 12/2019 | Sehn |
| 10,614,855 B2 | 4/2020 | Huang |
| 10,748,347 B1 | 8/2020 | Li et al. |
| 10,958,608 B1 | 3/2021 | Allen et al. |
| 10,962,809 B1 | 3/2021 | Castaneda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castaneda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 2011/0292076 A1* | 12/2011 | Wither ............ G06F 16/9537 345/632 |
| 2012/0249416 A1 | 10/2012 | Maciocci et al. |
| 2014/0364227 A1* | 12/2014 | Langlois ............ G06F 3/005 463/32 |
| 2018/0005429 A1* | 1/2018 | Osman ............ G06T 15/20 |
| 2018/0101989 A1* | 4/2018 | Frueh ............ G06K 9/00255 |
| 2019/0347826 A1* | 11/2019 | Zhang ............ G06K 9/4604 |
| 2021/0011612 A1 | 1/2021 | Dancie et al. |
| 2021/0035368 A1* | 2/2021 | Schouela ............ G06T 19/20 |
| 2021/0074016 A1 | 3/2021 | Li et al. |
| 2021/0166732 A1 | 6/2021 | Shaburova et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |

OTHER PUBLICATIONS

"International Application Serial No. PCT/US2021/016579, Written Opinion dated May 10, 2021", 7 pgs.

Ahuja, Karan, et al., "BodySLAM: Opportunistic User Digitization in Multi-User AR/VR Experiences", Symposium on Spatial User Interaction, ACMPUB27, New York, NY, USA, (Oct. 31, 2020), 1-8.

Belghit, Hayet, et al., "Vision-based Collaborative & Mobile Augmented Reality", (Apr. 8, 2015), 1-4.

Huo, Ke, "SynchronizAR: Instant Synchronization for Spontaneous and Spatial Collaborations in Augmented Reality", User Interface Software and Technology, ACM, 2 Penn Plaza, Suite 701New YorkNY10121-0701USA, (Oct. 11, 2018), 19-30.

Taketomi, Takafumi, et al., "Visual SLAM algorithms: a survey from 2010 to 2016", IPSJ Transactions on Computer Vision and Applications, vol. 9, No. 1, (Dec. 1, 2017), 11 pgs.

\* cited by examiner

AUGMENTED REALITY SESSION CREATION USING SKELETON TRACKING

BACKGROUND

Augmented-Reality (AR) is a modification of a virtual environment. For example, in Virtual Reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
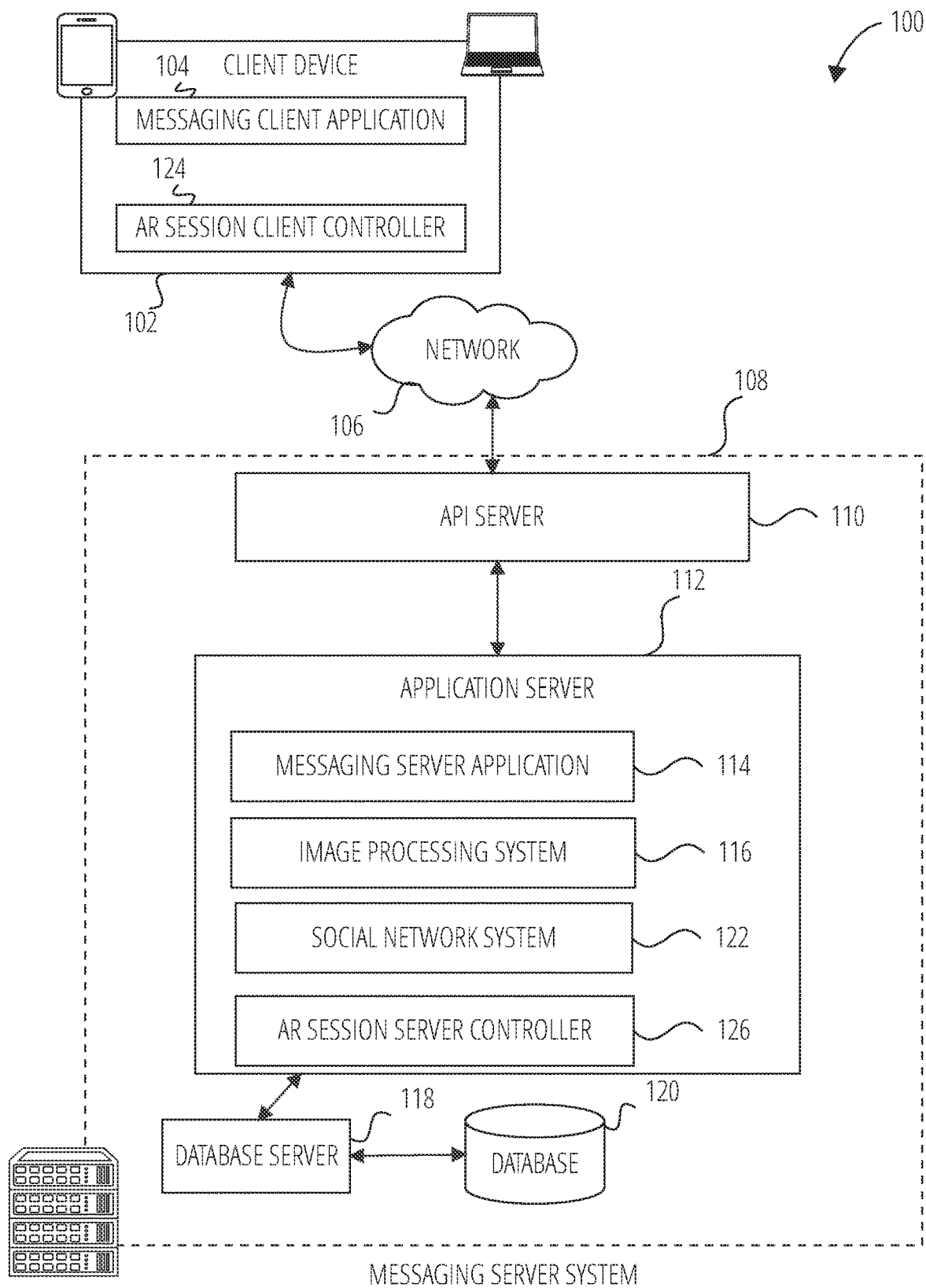
FIG. 1 is a diagrammatic representation of a networked environment in which the present disclosure may be deployed, in accordance with some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of an AR creation software and system by establishing a common coordinate system for a shared AR session that is based on skeletal positions and tracking. In one embodiment, the system hosts a shared AR session that is a session in which a plurality of users via client devices can participate. Each user in the shared AR session can see the same AR objects positioned in the real-world scene from each user's own perspective. The shared AR session can be, for example, an AR car racing game in which each user is controlling a different car. Each of the users are looking at the same shared AR scene that includes real-world objects being displayed on the client devices at the same time. A common AR object or set of AR objects, such as AR cars, are displayed on each of the client devices in the shared AR scene. This way, the users can view the AR scene from different orientations, positioning and perspectives while still seeing the common AR object or set of AR objects. The experience can be synchronized and shared between all the users. In this example, the actions of one user in the shared AR session can be synchronized and broadcast to all the other users. Accordingly, the shared AR session is a shared virtual space but in AR. As another example, two users can point their devices towards a real-world scene containing a table. The two users can be next to each other or across the table from each other. An AR object, such as a virtual paper can be placed on the real-world table and viewed by each of the users on their respective devices. As one user modifies the virtual paper by writing in virtual ink on the paper, the other user can see the virtual paper being modified at the same time.

One challenge of generating the shared AR session is to establish the origin of the shared AR scene and how shared AR scene is aligned relative to the surroundings. For example, while the users are tracking the shared AR scene, each of the client devices can detect its location in space and its movement within the shared AR scene. However, the client devices may not detect or determine the same location of origin or how the AR scene is aligned relative to the surroundings of the respective device in the shared AR scene. Therefore, while each of the client devices are rendering the same virtual content (e.g., cars, racetrack), the virtual content may not appear at the same place within the shared AR scene on each device. For example, the virtual content may not be rotated to align in the same way on each of the client devices' display screens.

The shared AR scene can be synchronized, in some cases, using predefined markers. For example, one device can display a barcode or other suitable predefined image for another device to scan and determine the appropriate transformation for the AR scene. Namely, the orientation of a first device on which the marker is displayed when the marker is scanned by a second device can be used by the second device to determine information about the coordinate system of the first device. An example of such a system is described in further detail in commonly-owned, commonly-assigned U.S. patent application Ser. No. 16/729,078, filed Dec. 27, 2019, which is hereby incorporated by reference in its entirety. While such a system generally works well for synchronizing the AR scene, generating the markers introduces some inefficiencies as images of the markers need to be stored and agreed upon before engaging in the shared AR session.

In one embodiment, the system implements a method for aligning all client devices in a shared AR session to a center of origin of the shared AR scene (or world) and rotating the shared AR scene in a particular orientation. In one embodiment, the system creates a shared AR session using skeletal tracking to establish the center of origin of the shared AR scene. Particularly, the disclosed embodiments improve upon systems that create shared AR sessions using markers by avoiding the need to predefine and store such markers. This reduces the number of steps needed to create a shared AR session, reduces overall processing and storage resources, and thereby improves the overall functioning of the electronic device. Also, by using skeletal tracking, errors in the AR session caused by drift of the common coordinate system can be corrected during the AR session. Particularly, the errors can be corrected, continuously or periodically, whenever a body is detected in the scene and without having to re-scan markers presented by other devices.

FIG. 1 is a block diagram showing an example system 100 for exchanging data (e.g., messages and associated content) over a network. The system 100 includes multiple instances of a client device 102, each of which hosts a number of applications including a messaging client application 104 and an AR session client controller 124. Each messaging client application 104 is communicatively coupled to other instances of the messaging client application 104 and a messaging server system 108 via a network 106 (e.g., the Internet). Each AR session client controller 124 is communicatively coupled to other instances of the AR session client controller 124 and an AR session server controller 126 in the messaging server system 108 via the network 106.

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

The AR session client controller 124 is able to communicate and exchange data with another AR session client controller 124 and with the AR session server controller 126 via the network 106. The data exchanged between the AR session client controller 124, and between the AR session client controller 124 and the AR session server controller 126 can include a session identifier that identifies the shared AR session, a transformation between a first device and a second device (e.g., plurality of client devices 102 include the first and a second device) that is used to align the shared AR session to a common point of origin, a common coordinate frame, functions (e.g., commands to invoke functions) as well as other payload data (e.g., text, audio, video or other multimedia data). In some cases, the AR session client controller 124 computes the transformation between two devices based on a position and orientation of a body part of a body depicted in one or more images captured by one of the two devices. For example, a first device of the two devices can include a camera that is pointed towards a user of a second device of the two devices. The first device can transmit the one or more images to the AR session server controller 126 along with position and orientation information of the first device. As an example, the first device can transmit the origin and coordinate system or frame of the first device. The AR session server controller 126 can process the one or more images to identify skeletal joint positions of the body depicted in the images. The AR session server controller 126 can identify a body part, such as a wrist joint position in the skeletal joint positions.

The AR session server controller 126 can compute a transformation (e.g., the common coordinate frame) based on the identified body part that represents how the identified body part is positioned in the AR scene relative to a position and orientation of the first device. Namely, the transformation represents how the body part (e.g., a wrist position) that corresponds to the origin of the second device appears to the first device. As an example, the second device may be held in a right hand of the user of the second device which means that the right wrist position is the point of origin according to which the second device generates AR content. By determining where this point of origin is with respect to the first device and providing this information in the form of a transformation to the second device, the second device can determine the offset by which to shift AR content the second device presents. The AR session server controller 126 sends the transformation to the second device so that the second device can adjust the AR coordinate system based on the transformation. In this way, the first and second devices synch up their coordinate systems and frames for displaying content in the AR session. Specifically, the AR session server controller 126 computes the point of origin of the second device in the coordinate system of the first device. The AR session server controller 126 can then determine an offset in the coordinate system of the second device based on the position of the point of origin from the perspective of the second device in the coordinate system of the second device. This offset is used to generate the transformation so that the second device generates AR content in according to a common coordinate system or frame as the first device.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116, a social network system 122, and an AR session server controller 126. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

Figure 3:
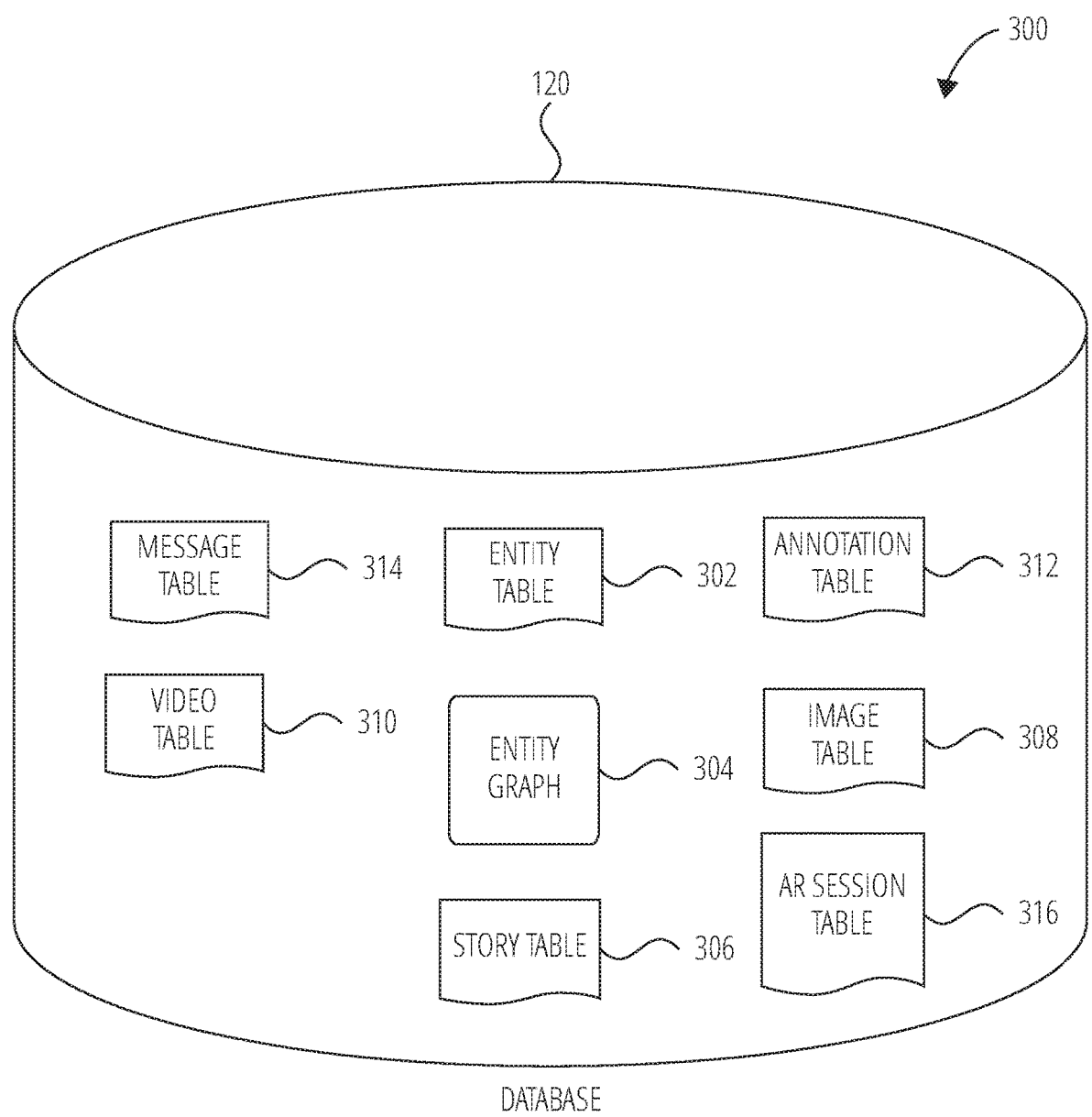
FIG. 3 is a diagrammatic representation of a data structure as maintained in a database, in accordance with some example embodiments.

The social network system 122 supports various social networking functions services and makes these functions and services available to the messaging server application 114. To this end, the social network system 122 maintains and accesses an entity graph 304 (as shown in FIG. 3) within the database 120. Examples of functions and services supported by the social network system 122 include the identification of other users of the messaging system 100 with which a particular user has relationships or is "following", and also the identification of other entities and interests of a particular user.

The application server 112 also includes the AR session server controller 126 that can communicate with the AR session client controller 124 in the client device 102 to establish individual or shared AR sessions. The AR session server controller 126 can also be coupled to the messaging server application 114 to establish an electronic group communication session (e.g., group chat, instant messaging) for the client devices in a shared AR session. The electronic group communication session can be associated with a session identifier provided by the client devices 102 to gain access to the electronic group communication session and to the shared AR session. In one embodiment, the client devices first gain access to the electronic group communication session and then obtain the session identifier in the electronic group communication session that allows the client devices to access to the shared AR session. In some embodiments, the client devices 102 are able to access the shared AR session without aid or communication with the AR session server controller 126 in the application server 112.

The application server 112 is communicatively coupled to a database server 118, which facilitates access to a database 120 in which is stored data associated with messages processed by the messaging server application 114.

Figure 2:
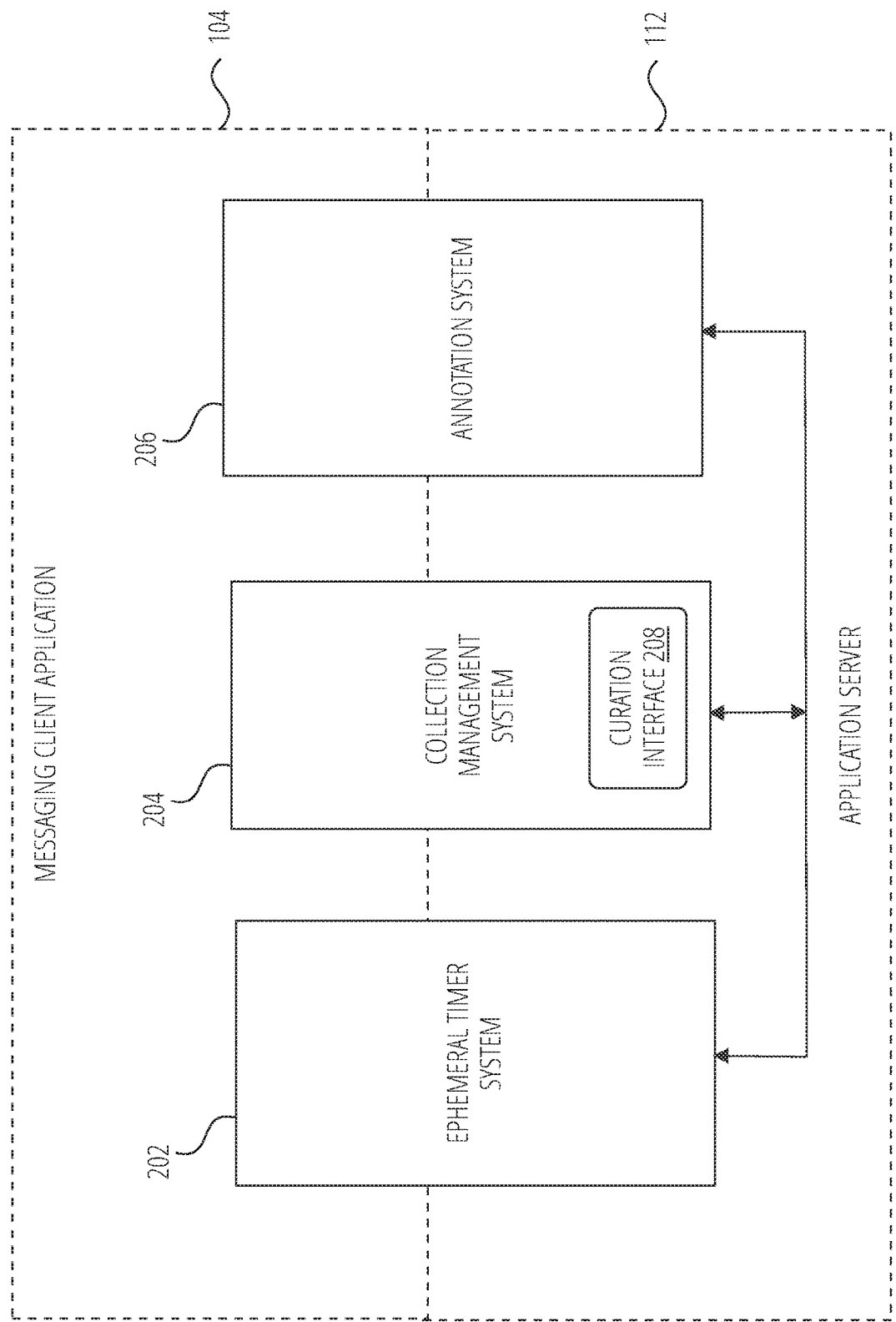
FIG. 2 is a diagrammatic representation of a messaging client application, in accordance with some example embodiments.

FIG. 2 is block diagram illustrating further details regarding the system 100, according to example embodiments. Specifically, the system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the system 100. The annotation system 206 operatively supplies a media overlay or supplementation (e.g., an image filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects.

Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filter is a data filter, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 is so-called "LENS" data. A "LENS" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

The database 120 can also store data pertaining to individual and shared AR sessions in the AR session table 316. The data in the AR session table 316 can include data communicated between the AR session client controller 124 and another AR session client controller 124, and data communicated between the AR session client controller 124 and the AR session server controller 126. Data can include data used to establish the common coordinate frame of the shared AR scene, the transformation between the devices, the session identifier, images depicting a body, skeletal joint positions, wrist joint positions, and so forth.

Figure 4:
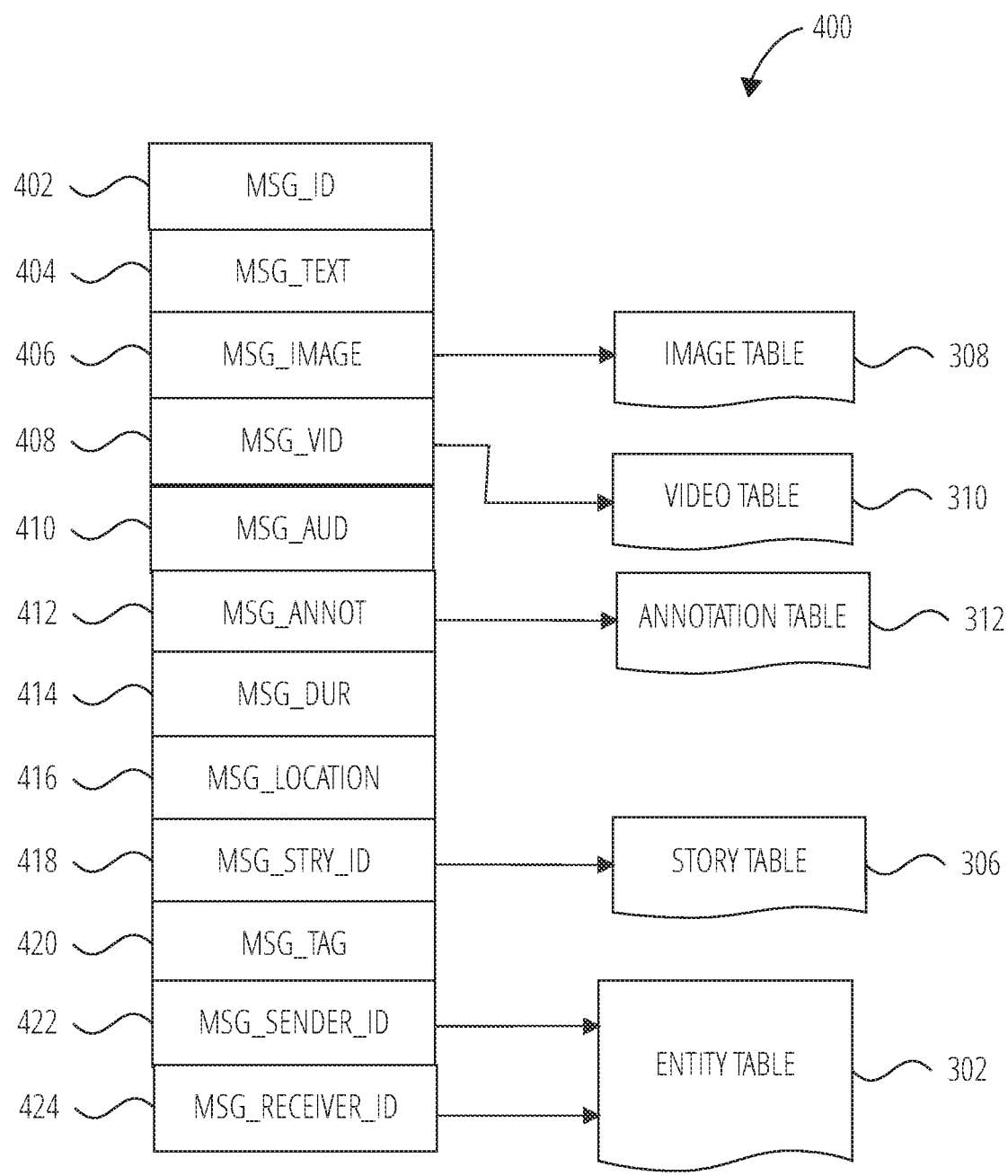
FIG. 4 is a diagrammatic representation of a message, in accordance with some example embodiments.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from a memory component of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from a memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
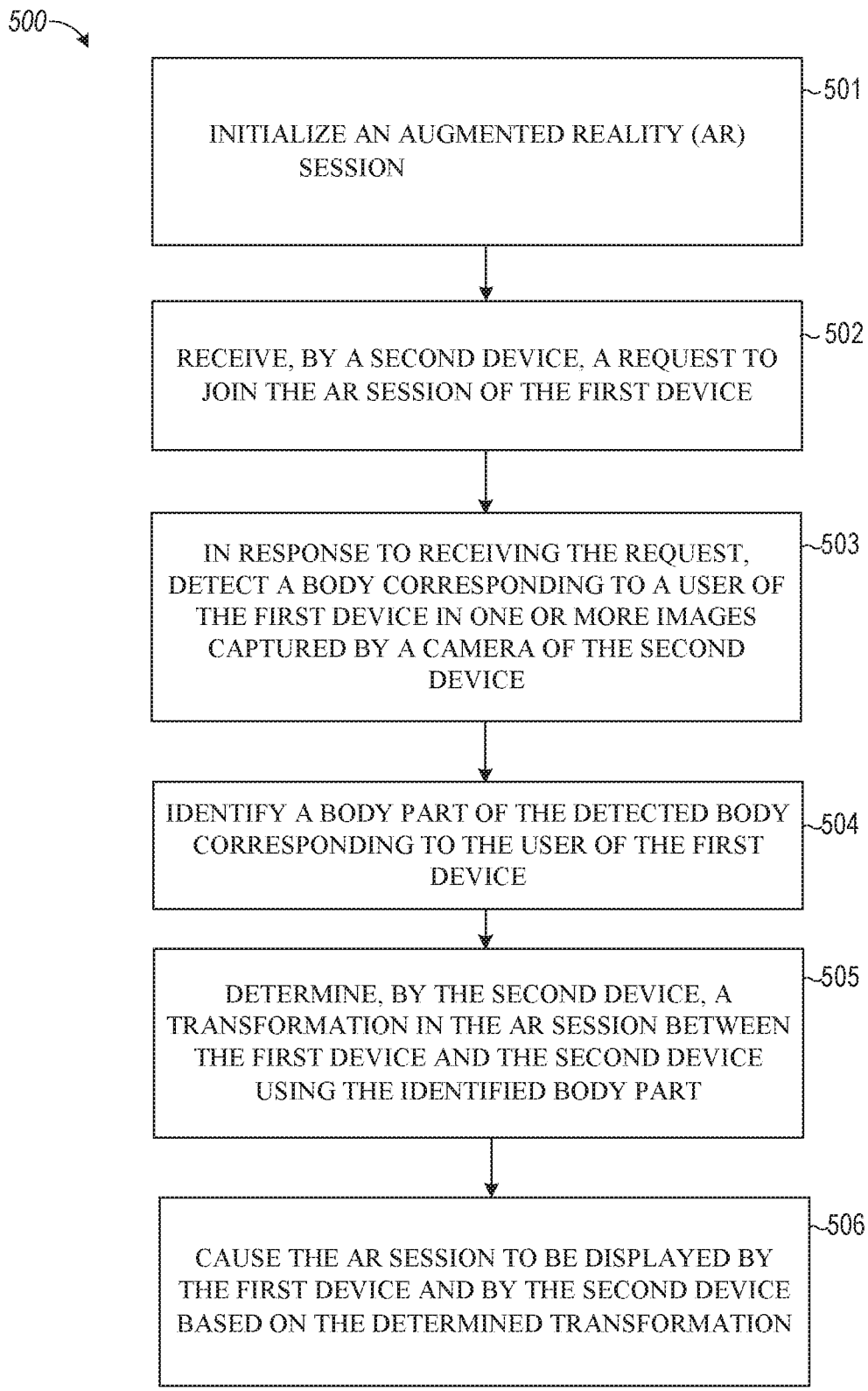
FIG. 5 is a flowchart of a process for creating an AR session using skeletal tracking, in accordance with some example embodiments.

FIG. 5 is a flowchart of a process for an AR session based on skeletal tracking, in accordance with some example embodiments. Although the flowcharts can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems, such as the systems described in FIG. 1, FIG. 7 and/or FIG. 8, or any portion thereof, such as a processor included in any of the systems.

At operation 501, an AR session is initialized (e.g., by a first device, by a second device, and/or on a server as a result of the first device starting an AR session). For example, the AR session client controller 124 in the first client device (e.g., client device 102) can initialize a shared AR session.

At operation 502, a second device receives a request to join the AR session of the first device. In response to receiving this request, the second device activates the AR session and initializes the AR session on the second device. In one embodiment, during initialization of the shared AR session, the first device and the second device can be in active Simultaneous Localization And Mapping (SLAM) sessions that are independent of each other, and these SLAM session maps need to be aligned with one another to establish the shared AR session. In one example, the second device receives a message, via the messaging client application 104, from the first device with an AR session identifier. The second device may receive a user selection (e.g., of an on-screen button or link) to join the AR session identified in the message. The second device, in response to receiving the user selection of the on-screen button, uses the AR session identifier to join a shared AR session with the first device so that the first and second devices synch up and display the same AR content relative to the real-world scene each device displays.

In some embodiments, initializing the shared AR session includes determining, by the first device, a first device transformation (e.g., known transformation $T_A$). The first device transformation can be based on a first device current pose and a first device origin. The first device current pose can be the position and orientation of the first device with respect to the real-world on an x, y, z-axis. The first device origin is an origin of a coordinate frame tracked by the first device. In some cases, the transformation $T_A$ can represent a transformation from the first device origin to the user's hand. Similarly, initializing the shared AR session can also include determining, by the second device, a second device transformation (e.g., known transformation $T_B$). The second device transformation can be based on a second device current pose and a second device origin. The second device current pose can be the position and orientation of the second device with respect to the real world on an x, y, z-axis. The second device origin is an origin of a coordinate frame tracked by the second device. The origin of the coordinate frame tracked by the first device can be different from the origin of the coordinate frame tracked by the second device. As such, a common transformation is computed to synch up the coordinate frames of the first and second devices so that AR content is consistently presented on the first and second devices.

At operation 503, in response to receiving the request to join the AR session of the first device, a body corresponding to a user of the first device is detected in one or more images captured by a camera of the second device. For example, in response to receiving the request, the second device displays a prompt to the user instructing the user to point the camera of the second device towards the user of the first device with whom the user of the second device would like to join the AR session. The second device captures one or more images as the user of the second device points the camera towards the user of the first device. The second device detects a body (e.g., a human pose) in the one or more images. For example, the second device detects a body in the one or more images by performing image processing and employing a human body recognition and classification process (e.g., using machine learning, such as a trained neural network).

At operation 504, the second device identifies a body part of the detected body corresponding to the user of the first device. For example, the second user of the second device can point the second device towards the first user of the first device such that the body of the first user is in the field of view of the camera included in the second device. The second device can then find the wrist position or wrist skeletal joint position corresponding to the hand of the first user that is holding the first device. The AR session client controller 124 in the second device detects the wrist skeletal joint position or transformation by analyzing one or more images within the camera's field of view. The skeletal joint transformation includes a position of the skeletal joint in 3D space and rotation information for the skeletal joint position. In one embodiment, the AR session client controller 124 implements a skeletal joint detection algorithm to detect the wrist skeletal joint position and transformation. Specifically, once a body is identified in the one or more images captured by the second device, the second device generates a skeletal joint representation of the body. The skeletal joint representation identifies a set of points that correspond to different skeletal joints of the body (e.g., a head joint, shoulder joints, arm joints, wrist joints, leg joints, feet joints, and so forth).

In some embodiments, the second device analyzes the body depicted in the one or more images to identify which hand (left or right) is holding the first device. The second device selects the skeletal joint of the wrist corresponding to the hand that is holding the first device. Particularly, the origin of the coordinate system of the first device is a constant point in 3D space of the device. The first device can compute a transform relative to this constant point to represent movement of the first device over time in relation to the constant origin point. In one embodiment, the transform represents the location of the hand that is holding the first device relative to the origin of the first device. As such, by identifying the wrist skeletal joint position and transformation of the hand that is holding the first device, the second device can determine the first device location in 3D space in the coordinate system of the second device. In some embodiments, the first device may be a head mounted device. In such cases, the second device analyzes the body depicted in the one or more images to identify the head on which the first device is mounted. The second device selects the skeletal joint of the head. Particularly, the transform of the first device is based on a location in 3D space of the head on which the first device is mounted relative to the origin of the first device. As such, by identifying the head skeletal joint position and transformation of the head on which the first device is mounted, the second device can determine the first device location in 3D space in the coordinate system of the second device.

At operation 505, the second device determines a transformation in the AR session between the first device and the second device using the identified body part. For example, the AR session client controller 124 of the second device determines a transformation ($T_C$) between origins of the first device and the second device using the wrist skeletal joint position or transformation (e.g., the skeletal joint transformation that represents the origin in the coordinate frame of the first device and includes rotation information). The transformation ($T_C$) can be a transformation matrix that describes the transformation between the origin of the first device and the origin of the second device. Specifically, the second device computes an offset or transformation from the origin of the first device in the coordinate system of the first device to the position of that origin in the coordinate system of the second device. As an example, the first device determines a transformation based on the origin of the first device that is at a first location in 3D space in the first device coordinate system. The second device identifies the origin of the first device (e.g., the position and transformation of the skeletal wrist joint) to be at a second location in 3D space of the second device coordinate system. The second device receives the first device coordinate system or transform determined by the first device and compares the location of the second location in the 3D space of the second device coordinate system with respect to the first location in the first device coordinate system. As an example, the second device determines that the second location is offset from the first location by 5 degrees and 3 centimeters. In response, the second device computes a transform that represents this offset between the origins of the two devices and may transmit this transform to the first device. The first device then shifts all the AR content the first device displays based on the offset indicated in the transform.

In one embodiment, the second device receives the first device transformation ($T_A$) from the first device and further uses the first device transformation ($T_A$) to determine the transformation ($T_C$) between an origin of the first device and an origin of the second device. In this embodiment, the transformation ($T_C$) can be a transformation matrix that describes the transformation between the first device transformation ($T_A$) (determined based on an origin of the first device) and the second device transformation ($T_B$) (determined based on an origin of the second device). The AR session client controller 124 of the second device can also determine a second offset based on the first device transformation ($T_A$). The second offset can be an offset of the second device current pose and the first device origin. In this embodiment, the second offset is daisy chained with offsets computed by other devices in the shared AR session to ensure that the devices in the shared AR session can align each other on the same origin of the AR shared session (e.g., shared AR world origin).

In one embodiment, the AR session client controller 124 of the second device determines the transformation ($T_C$) between origins of the first device and the second device by using a position or transformation of the wrist skeletal joint position in the one or more images, a scale of the wrist skeletal joint position or transformation in the one or more images, or a rotation of the wrist skeletal joint position or transformation in the one or more images or any combination thereof. For example, to determine the transformation ($T_C$), the AR session client controller 124 of the second device can use basic computer vision, manipulation of the image, geometry, translation, visual representations, angles, distances, and so forth.

In one embodiment, the AR session client controller 124 of the second device transmits the transformation ($T_C$) to the AR session client controller 124 of the first device and/or the AR session server controller 126. The AR session client controller 124 of the second device can also transmit the transformation ($T_C$) in the (group) communication session, such as via the messaging client application 104. In some embodiments, the AR session client controller 124 of the second device determines a common coordinate frame using the transformation ($T_C$). In some embodiment, the AR session client controller 124 of the first device determines the common coordinate frame using the transformation ($T_C$) received from the second device.

At operation 506, the AR session client controller 124 in the first device causes the shared AR session to be displayed by the first device and the AR session client controller 124 in the second device causes the shared AR session to be displayed by the second device based on the determined transformation. In one embodiment, the shared AR scenes included in the shared AR session are caused to be displayed by the first device and the second device.

In one embodiment, the AR session client controller 124 of the second device can filter out images of the wrist joint position or transformation that result in a transformation ($T_C$) that is contrary to gravity. Although the frames captured of the wrist joint position or transformation are offset in rotation in a position along the ground plane, both the first device and the second device can align each other on where the ground is (e.g., which direction is up versus down). The AR session client controller 124 of the second device performs a gravity check by determining whether the first current pose that is observed (or the image of the wrist joint position that is captured) is contrary to gravity.

In this embodiment, the AR session client controller 124 of the second device receives information including the angle of the gravity axis and uses this information to compare with the tracking data of the wrist joint position (e.g., frames captured of the marker by the camera in second device). The AR session client controller 124 of the second device then checks whether the first device and the second device match how the poses of the first device are oriented with respect to the gravity position. The AR session client controller 124 of the second device can then filter out the data (or frames captured of the marker) where there is disagreement on the orientation with respect to the gravity position (e.g., lower quality data).

As an example, after the transform is provided to the first device, the first and second device synchronize display of AR content. Specifically, the respective cameras of the first device and second device can be pointed at a real-world table from different angles. The AR session may cause an AR paper object (e.g., virtual paper) to be displayed on top of the real-world table. In such cases, the first device displays the AR paper object on top of the real-world table on a screen of the first device at the same time as the second device displays the same common AR paper object on top of the same real-world table on a screen of the second device. To synchronize the location of the AR paper, the first device shifts or changes the position of the placement of the AR paper object relative to the origin of the first device coordinate frame based on the transformation received from the second device.

In some embodiments, the second device re-computes or re-calculates the transformation between the coordinate system of the first and second device when the body of the user of the first device is detected in one or more images captured by the second device. For example, the first and second devices begin engaging in a shared AR session using an initially computed transformation. The transformation may have been computed or determined by the second device using a marker displayed by the first device and/or by identifying a skeletal wrist joint position or transformation of the user of the first device. At some later time (e.g., after five minutes) of the first and second devices being engaged in the shared AR session, the second device may again identify a body and a corresponding body part (e.g., a wrist skeletal joint position) in the real-world images captured by the second device. In response to identifying the body, the second device performs the above described process to compute a second transformation in the AR session between the first device and the second device using the identified body part. In some embodiments, the second transformation is computed each time the body is identified in the one or more images captured by the second device. In some embodiments, the second transformation is computed periodically at predetermined time intervals (e.g., every five minutes into the shared AR session). In such cases, after the predetermined time interval elapses, then the second device starts processing images captured by the second device to identify a body of the user of the first device. In some implementations, the body of the user of the first device may not appear until a few minutes or hours after the predetermined time interval is reached. But once the body is identified a few minutes or hours after the predetermined time interval is reached, the second transformation is computed based on the body that is identified. In some cases, an image of the body of the user of the first device is captured before the predetermined time interval is reached but is buffered and processed after the predetermined time interval is reached to compute the second transformation.

In some embodiments, the second device compares the second transformation that has been most recently computed with a previously computed and determined transformation. The second device computes an error based on comparing the second transformation with the previously computed and determined transformation. The second device determines whether or not to update the transformation used by the first device with the second transformation based on the value of the error with respect to a threshold. Specifically, if the second device determines that the error is less than a threshold, the second device prevents updating the transformation used by the first device with the second transformation. Namely, the first device maintains presenting the shared AR session content based on the previously determined transformation and not based on the most recently computed second transformation.

In some implementations, if the second device determines that the error is equal to or greater than the threshold, the second device causes the AR session to be displayed based on the second transformation. Specifically, the second device sends the second transformation to the first device with an instruction to replace the currently used transformation with the second transformation. An reference above or below to skeletal joint positions should be understood to include the position in 3D space of the skeletal joint position as well as rotational information about the skeletal joint position.

In some embodiments, a plurality of thresholds are stored or accessed by the second device. The threshold against which the second device compares the error between two transformations is selected from the plurality of thresholds based on positioning of content within the shared AR session. As an example, a first threshold of the plurality of thresholds may correspond to AR content that is positioned in relation to one or more real-world objects. Specifically, the first threshold may correspond to the display of virtual objects on top of, underneath, on the side of, or at some other position relative to a real-world object. For instance, the first threshold may correspond to a virtual paper object placed on top of a table. Such a threshold may be a very small value as the precision in placement of the virtual object may need to be high. In such cases, the first and second devices may need to very accurately place the virtual object relative to the real-world object. As another example, a second threshold that is larger than the first threshold may correspond to AR content that is positioned independently of any real-world objects. Specifically, the second threshold may correspond to display of a virtual object anywhere in the real-world scene, such as a floating virtual paper or virtual graphics. The positioning of such a virtual object does not depend on the positioning of the real-world object and, as such, the level of precision in placement of the virtual object may be kept low. As another example, a third threshold may correspond to the type of virtual content that is presented in an AR session. Specifically, the third threshold may be a relatively large value when the virtual content corresponds to a first object size and may be a relatively small value when the virtual content corresponds to a second object size that is smaller than the first object size. The third threshold may be a relatively large value when the virtual content corresponds to a static object and may be a relatively small value when the virtual content corresponds to an animated object.

In some embodiments, the second device determines what type of virtual content is being displayed in the shared AR session between the first and second devices and whether the virtual content is placed in relation to real-world objects. The second device selects one of the plurality of thresholds to compare against the error between the transformations based on the type of virtual content and whether the virtual content is positioned or placed in relation to real-world objects or not. In some cases, multiple AR objects are displayed in a shared AR session. In such cases, the second device retrieves multiple thresholds corresponding to each of the AR objects and selects the threshold having the smallest value of the multiple thresholds. The selected threshold is used by the second device to compare against the error computed between the second transformation and a previously computed transformation currently being used to generate the shared AR session.

In some embodiments, the second device can join a shared AR session with the first device by adjusting a transformation determined by the second device. In such cases, each device that joins the AR session may not need to transmit back a shared transformation. For example, the second device can identify the skeletal joint position corresponding to the first device (e.g., the hand that is holding the first device or the head on which the first device is mounted). The second device can compute a transformation of the coordinate frame the second device determines based on an origin of the second device based on a point in 3D space corresponding to the identified skeletal joint position. The second device can adjust the coordinate frame of the second device based on the transformation. This way, placement and positioning of virtual content presented by the second device is adjusted relative to the origin of the second device and the identified skeletal joint position corresponding to the first device. The virtual content placement and positioning is synchronized with the manner at which the same content is presented on the first device based on the transformation computed by the second device. In this implementation, the device that is joining the shared AR session (e.g., the second device) adjusts its own coordinate frame used to present AR content rather than the device that initiated the AR session (e.g., the first device). The first device in this case continues to present content in the AR session based on the coordinate frame of the first device without adjusting the coordinate frame based on the computed transformation. The second device adjusts the coordinate frame of the second device based on the computed transformation to synchronize display of the content on the second device based on the determined position in 3D space of the first device using the skeletal joint position corresponding to the first device.

Figure 6:
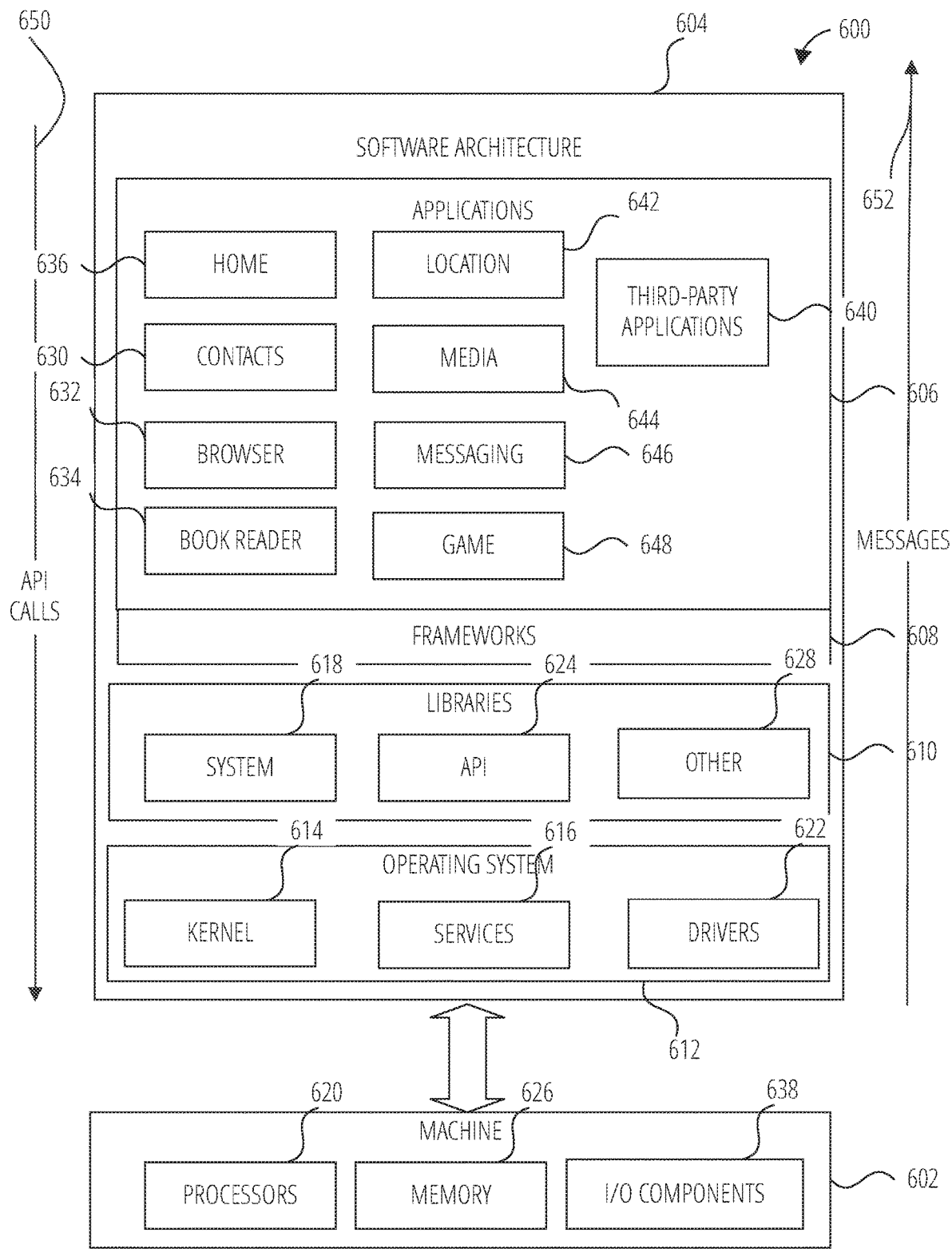
FIG. 6 is block diagram showing a software architecture within which the present disclosure may be implemented, in accordance with some example embodiments.

FIG. 6 is a block diagram 600 illustrating a software architecture 604, which can be installed on any one or more of the devices described herein. The software architecture 604 is supported by hardware such as a machine 602 that includes processors 620, memory 626, and I/O components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionality. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 610 provide a low-level common infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC). Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 610 can also include a wide variety of other libraries 628 to provide many other APIs to the applications 606.

The frameworks 608 provide a high-level common infrastructure that is used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In an example embodiment, the applications 606 may include a home application 636, a contacts application 630, a browser application 632, a book reader application 634, a location application 642, a media application 644, a messaging application 646, a game application 648, and a broad assortment of other applications such as third-party applications 640. The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the third-party applications 640 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 640 can invoke the API calls 650 provided by the operating system 612 to facilitate functionality described herein.

Figure 7:
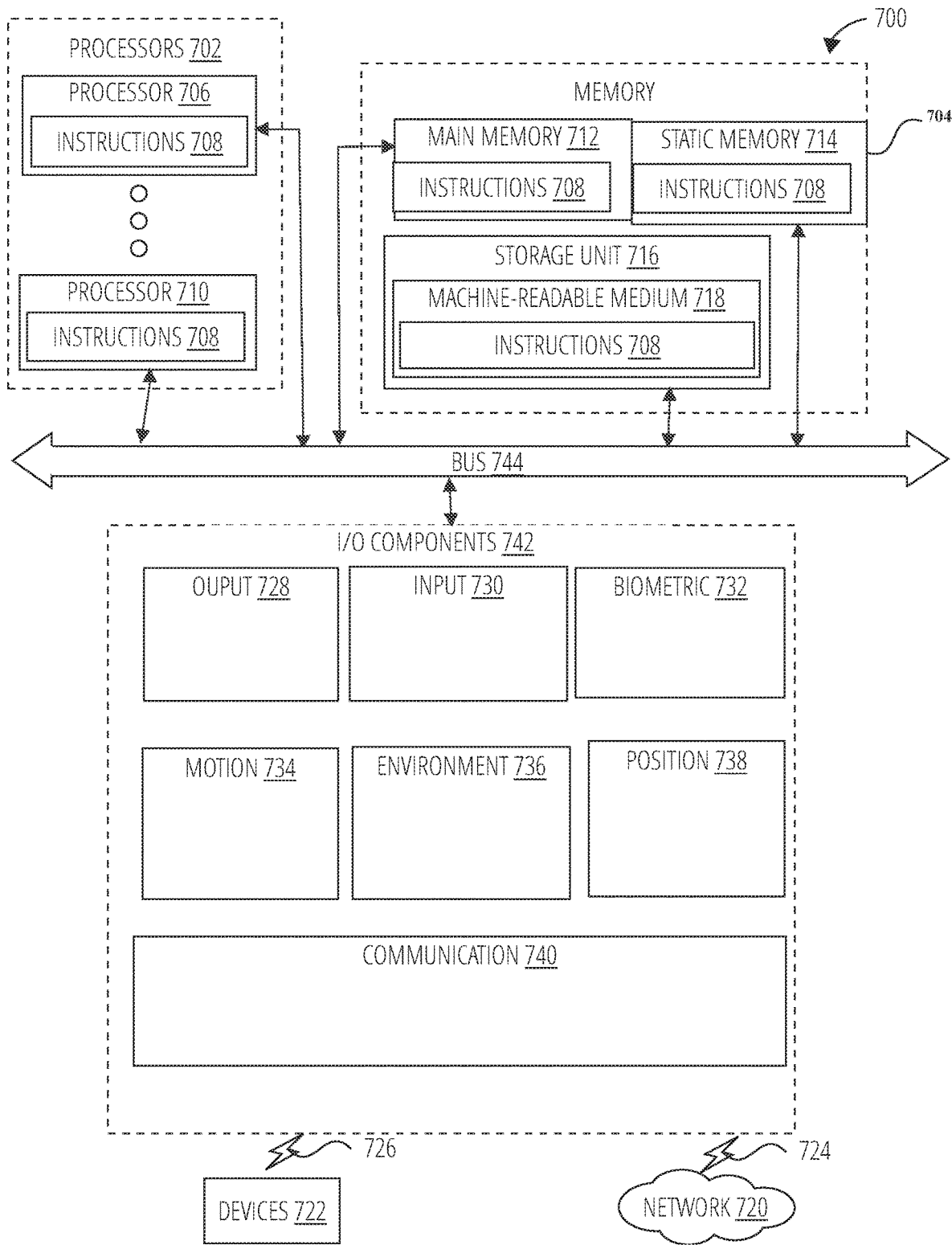
FIG. 7 is a diagrammatic representation of a machine, in the form of a computer system within which a set of instructions may be executed for causing the machine to perform any one or more of the methodologies discussed, in accordance with some example embodiments.

FIG. 7 is a diagrammatic representation of a machine 700 within which instructions 708 (e.g., software, a program, an application, an applet, an app, or other executable code) for causing the machine 700 to perform any one or more of the methodologies discussed herein may be executed. For example, the instructions 708 may cause the machine 700 to execute any one or more of the methods described herein. The instructions 708 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 708, sequentially or otherwise, that specify actions to be taken by the machine 700. Further, while only a single machine 700 is illustrated, the term "machine" shall also be taken to include a collection of machines that individually or jointly execute the instructions 708 to perform any one or more of the methodologies discussed herein.

The machine 700 may include processors 702, memory 704, and I/O components 742, which may be configured to communicate with each other via a bus 744. In an example embodiment, the processors 702 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 706 and a processor 710 that execute the instructions 708. The term "processor" is intended to include multi-core processors that may comprise two or more independent processors (sometimes referred to as "cores") that may execute instructions contemporaneously. Although FIG. 7 shows multiple processors 702, the machine 700 may include a single processor with a single core, a single processor with multiple cores (e.g., a multi-core processor), multiple processors with a single core, multiple processors with multiples cores, or any combination thereof.

The memory 704 includes a main memory 712, a static memory 714, and a storage unit 716, both accessible to the processors 702 via the bus 744. The main memory 704, the static memory 714, and storage unit 716 store the instructions 708 embodying any one or more of the methodologies or functions described herein. The instructions 708 may also reside, completely or partially, within the main memory 712, within the static memory 714, within machine-readable medium 718 within the storage unit 716, within at least one of the processors 702 (e.g., within the processor's cache memory), or any suitable combination thereof, during execution thereof by the machine 700.

The I/O components 742 may include a wide variety of components to receive input, provide output, produce output, transmit information, exchange information, capture measurements, and so on. The specific I/O components 742 that are included in a particular machine will depend on the type of machine. For example, portable machines such as mobile phones may include a touch input device or other such input mechanisms, while a headless server machine will likely not include such a touch input device. It will be appreciated that the I/O components 742 may include many other components that are not shown in FIG. 7. In various example embodiments, the I/O components 742 may include output components 728 and input components 730. The output components 728 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 730 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 742 may include biometric components 732, motion components 734, environmental components 736, or position components 738, among a wide array of other components. For example, the biometric components 732 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 734 include acceleration sensor components (e.g., accelerometer), gravitation sensor components, rotation sensor components (e.g., gyroscope), and so forth. The environmental components 736 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 742 further include communication components 740 operable to couple the machine 700 to a network 720 or devices 722 via a coupling 724 and a coupling 726, respectively. For example, the communication components 740 may include a network interface component or another suitable device to interface with the network 720. In further examples, the communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 722 may be another machine or any of a wide variety of peripheral devices (e.g., a peripheral device coupled via a USB).

Moreover, the communication components 740 may detect identifiers or include components operable to detect identifiers. For example, the communication components 740 may include Radio Frequency Identification (RFID) tag reader components. NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geolocation, location via Wi-Fi® signal triangulation, location via detecting an NFC beacon signal that may indicate a particular location, and so forth.

The various memories (e.g., memory 704, main memory 712, static memory 714, and/or memory of the processors 702) and/or storage unit 716 may store one or more sets of instructions and data structures (e.g., software) embodying or used by any one or more of the methodologies or functions described herein. These instructions (e.g., the instructions 708), when executed by processors 702, cause various operations to implement the disclosed embodiments.

The instructions 708 may be transmitted or received over the network 720, using a transmission medium, via a network interface device (e.g., a network interface component included in the communication components 740) and using any one of a number of well-known transfer protocols (e.g., hypertext transfer protocol (HTTP)). Similarly, the instructions 708 may be transmitted or received using a transmission medium via the coupling 726 (e.g., a peer-to-peer coupling) to the devices 722.

Figure 8:
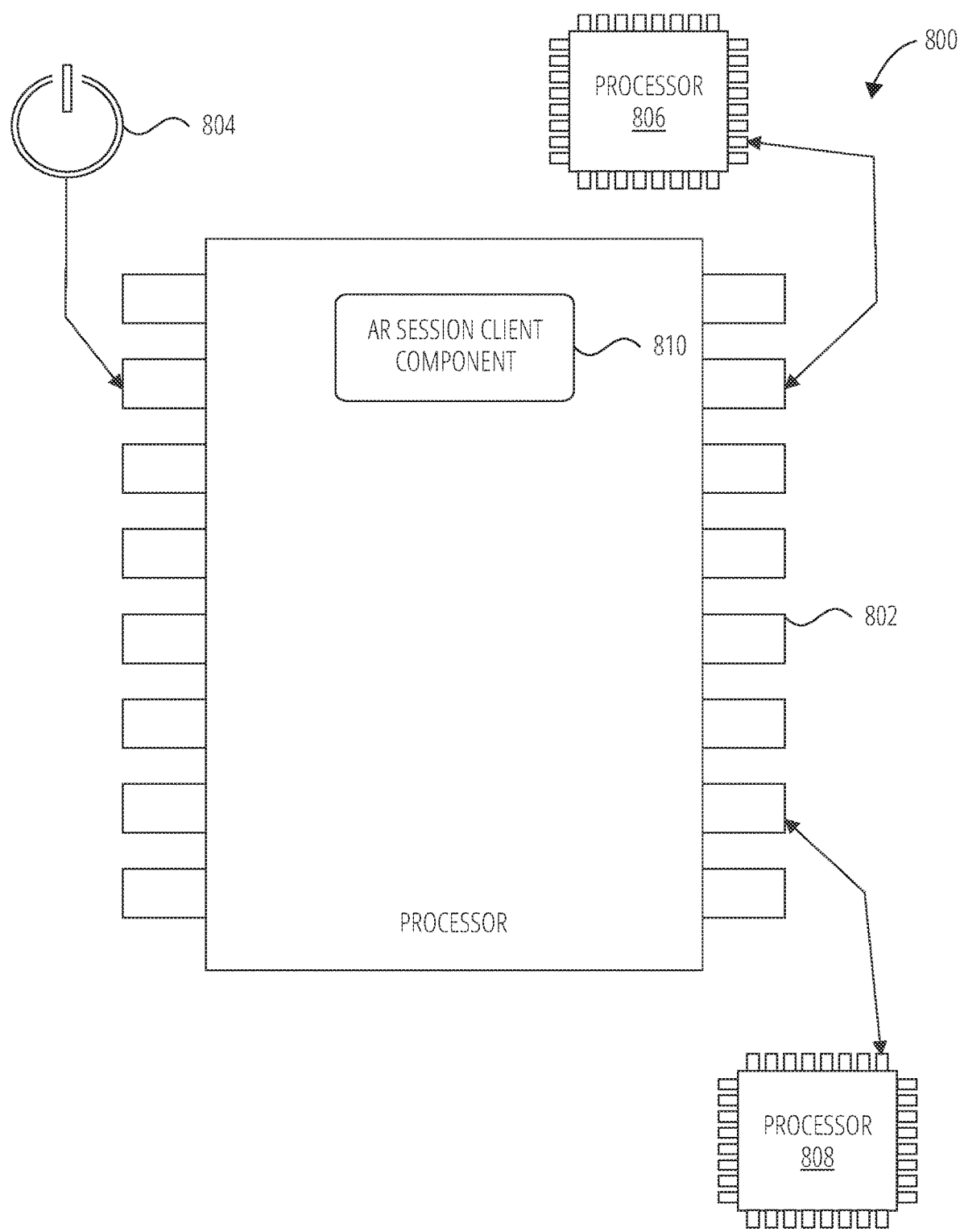
FIG. 8 is a diagrammatic representation of a processing environment, in accordance with some example embodiments.

Turning now to FIG. 8, there is shown a diagrammatic representation of a processing environment 800, which includes the processor 806, the processor 808, and a processor 802 (e.g., a GPU, CPU or combination thereof).

The processor 802 is shown to be coupled to a power source 804, and to include (either permanently configured or temporarily instantiated) modules, namely an AR session client controller component 810. The AR session client component 810 operationally can, for example, initialize a shared AR session, cause a marker to be displayed, capture an image of the marker using a camera, generate a transformation ($T_C$) and a common coordinate frame, and causes the shared AR session to be displayed. While not shown the processor 802 can alternatively include an AR session server controller component that can perform the operations of the AR session server controller 126. As illustrated, the processor 802 is communicatively coupled to both the processor 806 and processor 808.

Where a phrase similar to "at least one of A. B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example. A and B. A and C. B and C, or A and B and C.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   receiving, by a second device, a request to join an augmented reality (AR) session initialized by a first device;
   in response to receiving the request, detecting a body corresponding to a user of the first device in one or more images captured by a camera of the second device;
   identifying a body part of the detected body corresponding to the user of the first device;

determining, by the second device, a transformation in the AR session between the first device and the second device using the identified body part, wherein determining the transformation comprises:
  computing a location of the first device in three-dimensional space in a coordinate system of the second device;
  transmitting a message comprising the location of the first device computed by the second device to the first device; and
  causing the first device to determine an offset from the location of the first device included in the message transmitted from the second device and a position of the location of the first device in a coordinate system of the first device;
causing the AR session to be displayed by the second device based on the determined transformation;
receiving information including an angle of a gravity axis, comparing the angle of the gravity axis to a joint position of the body part; and
based on the comparing, filtering data in the AR session in response to detecting a disagreement on an orientation of the second device with respect to the gravity axis.

2. The method of claim 1 further comprising:
determining a common coordinate frame using the transformation; and
generating the AR session using the common coordinate frame.

3. The method of claim 1, wherein the AR session is initialized by the first device by determining, by the first device, a first device transformation based on a first device current pose and a first device origin, wherein the first device origin is a first origin of a first coordinate frame tracked by the first device.

4. The method of claim 3, further comprising determining, by the second device, a second device transformation in response to receiving the request to join the AR session of the first device, the second device transformation being based on a second device current pose and a second device origin, wherein the second device origin is a second origin of a second coordinate frame tracked by the second device.

5. The method of claim 1, further comprising:
sending to the first device, from the second device, the transformation representing coordinates of AR content displayed on the second device relative to a position of the first device.

6. The method of claim 5, wherein determining, by the second device, the transformation between the first device and the second device comprises:
determining, by the second device, a second offset based on a current pose of the second device and an origin of the first device.

7. The method of claim 1, where identifying the body part further comprises:
processing the one or more images to identify a plurality of skeletal positions of the body; and
identifying the skeletal position from the plurality of skeletal positions corresponding to the body part.

8. The method of claim 7, wherein the body part is a wrist and the skeletal position corresponding to the body part comprises a wrist joint.

9. The method of claim 8, further comprising:
searching the one or more images for an image of the first device;
determining that the first device is being held by the first user in a right hand of the first user; and
selecting the wrist corresponding to the right hand as the body part based on determining that the first device is being held by the first user in the right hand of the first user.

10. The method of claim 1, wherein the first device uses a first coordinate frame to display AR objects, wherein the second device uses a second coordinate frame to display AR objects, and wherein causing the AR session to be displayed by the first device and by the second device comprises:
displaying a common AR object session on the second device based on the second coordinate frame;
causing the first device to adjust the first coordinate frame of the first device based on the transformation in the AR session between the first device and the second device; and
causing the first device to display the common AR object in the AR session on the first device based on adjusting the first coordinate frame.

11. The method of claim 1, wherein the transformation is a first transformation, and the method further comprises:
calculating a second transformation during the AR session when the body is detected in additional images captured subsequently to the one or more images.

12. The method of claim 11, further comprising:
calculating the second transformation each time the body is detected during the AR session.

13. The method of claim 11, wherein the second transformation is re-calculated periodically.

14. The method of claim 11, further comprising:
comparing the first transformation to the second transformation;
computing an error based on comparing the first transformation to the second transformation;
in response to determining that the error is less than a threshold, maintaining display of the AR session based on the first transformation.

15. The method of claim 14, further comprising:
in response to determining that the error is equal to or greater than the threshold, causing the AR session to be displayed by the first device and by the second device based on the second transformation.

16. The method of claim 1, further comprising:
comparing the first transformation to a second transformation to compute an error;
selecting a first threshold from a plurality of threshold;
in response to determining that the error is less than the selected first threshold, maintaining display of the AR session based on the first transformation, wherein the first threshold of the plurality of thresholds corresponds to AR content that is positioned in relation to one or more real-world objects, a second threshold of the plurality of thresholds corresponds to AR content that is positioned independently of any real-world objects, and the first threshold is smaller than the second threshold.

17. The method of claim 1, further comprising:
initializing the AR session using a given transformation between the first device and the second device that is computed based on a marker displayed on the first device; and
updating the given transformation using the AR session based on the transformation determined using the identified body part.

18. A system comprising:
a processor; and a memory component having instructions stored thereon, when executed by the processor, causes the processor to perform operations comprising:

receiving, by a second device, a request to join an AR session initialized by a first device;

in response to receiving the request, detecting a body corresponding to a user of the first device in one or more images captured by a camera of the second device;

identifying a body part of the detected body corresponding to the user of the first device;

determining, by the second device, a transformation in the AR session between the first device and the second device using the identified body part, wherein determining the transformation comprises:

computing a location of the first device in three-dimensional space in a coordinate system of the second device;

transmitting a message comprising the location of the first device computed by the second device to the first device; and causing the first device to determine an offset from the location of the first device included in the message transmitted from the second device and a position of the location of the first device in a coordinate system of the first device;

causing the AR session to be displayed by the second device based on the determined transformation;

receiving information including an angle of a gravity axis;

comparing the angle of the gravity axis to a joint position of the body part; and based on the comparing, filtering data in the AR session in response to detecting a disagreement on an orientation of the second device with respect to the gravity axis.

19. The system of claim 18, the operations further comprising:

initializing the AR session using a given transformation between the first device and the second device that is computed based on a marker displayed on the first device; and updating the given transformation using the AR session based on the transformation determined using the identified body part.

20. A non-transitory computer-readable storage medium having stored thereon, instructions when executed by a processor, causes the processor to perform operations comprising:

receiving, by a second device, a request to join an AR session initialized by a first device;

in response to receiving the request, detecting a body corresponding to a user of the first device in one or more images captured by a camera of the second device;

identifying a body part of the detected body corresponding to the user of the first device;

determining, by the second device, a transformation in the AR session between the first device and the second device using the identified body part, wherein determining the transformation comprises:

computing a location of the first device in three-dimensional space in a coordinate system of the second device;

transmitting a message comprising the location of the first device computed by the second device to the first device; and causing the first device to determine an offset from the location of the first device included in the message transmitted from the second device and a position of the location of the first device in a coordinate system of the first device;

causing the AR session to be displayed by the second device based on the determined transformation;

receiving info information including an angle of a gravity axis;

comparing the angle of the gravity axis to a joint position of the body part; and based on the comparing, filtering data in the AR session in response to detecting a disagreement on an orientation of the second device with respect to the gravity axis.

\* \* \* \* \*

UNITED STATES PATENT AND TRADEMARK OFFICE
CERTIFICATE OF CORRECTION

PATENT NO.        : 11,488,358 B2
APPLICATION NO.   : 16/782874
DATED             : November 1, 2022
INVENTOR(S)       : Cowburn et al.

It is certified that error appears in the above-identified patent and that said Letters Patent is hereby corrected as shown below:

In the Claims

In Column 21, Line 18, in Claim 1, delete "axis," and insert --axis;-- therefor

In Column 22, Line 10, in Claim 10, after "object", insert --in the AR--

In Column 24, Line 4, in Claim 20, delete "Anon-transitory" and insert --A non-transitory-- therefor In Column 24, Line 33, in Claim 20, after "receiving", delete "info"

Signed and Sealed this
Nineteenth Day of September, 2023

Katherine Kelly Vidal
*Director of the United States Patent and Trademark Office*